(12) United States Patent
Yoo et al.

(10) Patent No.: US 11,713,546 B2
(45) Date of Patent: Aug. 1, 2023

(54) METHOD FOR MANUFACTURING PAPER BUFFER TRAY FOR PACKAGING AND BUFFER TRAY MANUFACTURED THEREBY

(71) Applicant: SIN WOO CO., LTD., Yongin-si (KR)

(72) Inventors: Young Pa Yoo, Yongin-si (KR); Jong Cheol Kang, Suwon-si (KR); Hong Jin Lee, Yongin-si (KR)

(73) Assignee: SIN WOO CO., LTD., Yongin-si (KR)

( * ) Notice: Subject to any disclaimer, the term of this patent is extended or adjusted under 35 U.S.C. 154(b) by 215 days.

(21) Appl. No.: 16/651,153

(22) PCT Filed: Sep. 30, 2019

(86) PCT No.: PCT/KR2019/012736
§ 371 (c)(1),
(2) Date: Mar. 26, 2020

(87) PCT Pub. No.: WO2021/060592
PCT Pub. Date: Apr. 1, 2021

(65) Prior Publication Data
US 2021/0095428 A1    Apr. 1, 2021

(30) Foreign Application Priority Data
Sep. 27, 2019   (KR) .......................... 10-2019-0119398

(51) Int. Cl.
*D21J 3/12*         (2006.01)
*B65D 81/113*    (2006.01)
(Continued)

(52) U.S. Cl.
CPC .............. *D21J 3/12* (2013.01); *B31F 1/0077* (2013.01); *B31F 5/04* (2013.01); *B65D 81/113* (2013.01);
(Continued)

(58) Field of Classification Search
CPC ... D21J 3/12; D21J 3/10; B31F 1/0077; B31F 5/04; B31F 1/07; B65D 81/113;
(Continued)

(56) References Cited

U.S. PATENT DOCUMENTS 2,395,703 A  *  2/1946  Wiley ....................... D21J 3/00
                                                                    156/204
2,590,221 A  *  3/1952  Samuels ................... D21J 7/00
                                                                    156/196
(Continued)

FOREIGN PATENT DOCUMENTS

CN         101198433 A        6/2008
CN         112867600 A  *    5/2021  ........... B31B 50/592
(Continued)

OTHER PUBLICATIONS

Machine Translation of JPH 07/256798 A. (Year: 1995).*
(Continued)

*Primary Examiner* — Jose A Fortuna
(74) *Attorney, Agent, or Firm* — Sughrue Mion, PLLC

(57) ABSTRACT

The present invention relates to a method for manufacturing a paper buffer tray for packaging and a buffer tray manufactured thereby, wherein a plurality of papers are laminated and processed such that some papers are cut in a length direction, wrinkles or the like are formed in the other papers, and press-molding is performed using a mold, thereby providing an eco-friendly buffer tray and overcoming a disadvantage in that it is difficult to mold a buffer tray by using an existing paper. The method for manufacturing the paper buffer tray for packaging includes: a raw material preparing step of preparing a raw material for manufacturing a buffer tray in which a plurality of papers are laminated; a molding preparing step of preparing at least one mold corresponding to a shape and size of a product to be
(Continued)

packaged; and a molding step of press-molding the raw material by using the at least one mold.

5 Claims, 3 Drawing Sheets

(51) Int. Cl.
| | | |
|---|---|---|
| *D21H 27/34* | (2006.01) | |
| *B31F 1/00* | (2006.01) | |
| *D21J 3/10* | (2006.01) | |
| *B31F 5/04* | (2006.01) | |
| *D21H 17/28* | (2006.01) | |

(52) U.S. Cl.
CPC ............. *D21H 17/28* (2013.01); *D21H 27/34* (2013.01); *D21J 3/10* (2013.01)

(58) Field of Classification Search
CPC ...... B65D 81/022; D21H 17/28; D21H 27/34; D21H 27/02; D21H 27/10; B31D 5/0008; B31D 5/0021; B31D 2205/0047
See application file for complete search history.

(56) References Cited

U.S. PATENT DOCUMENTS

| | | | | | |
|---|---|---|---|---|---|
| 4,313,899 | A | * | 2/1982 | Hain | B31F 1/36 |
| | | | | | 264/40.1 |
| 5,643,384 | A | * | 7/1997 | Okabe | B31F 1/0077 |
| | | | | | 156/206 |
| 7,008,509 | B1 | * | 3/2006 | Otani | D21J 3/10 |
| | | | | | 162/218 |
| 8,763,667 | B2 | * | 7/2014 | De Luca | B32B 27/065 |
| | | | | | 156/523 |
| 9,132,612 | B2 | * | 9/2015 | Bohrer | B32B 27/10 |
| 9,242,446 | B2 | * | 1/2016 | Wang | B29C 70/202 |
| 9,783,928 | B2 | * | 10/2017 | Zheng | D21F 7/006 |
| 9,994,005 | B2 | * | 6/2018 | Oomori | D21H 27/10 |
| 2004/0105941 | A1 | * | 6/2004 | Terada | D21H 19/824 |
| | | | | | 428/34.2 |
| 2006/0127648 | A1 | * | 6/2006 | De Luca | B32B 27/08 |
| | | | | | 428/174 |
| 2007/0151687 | A1 | * | 7/2007 | Halabisky | D21H 27/10 |
| | | | | | 162/146 |
| 2008/0093251 | A1 | * | 4/2008 | Meyer | B65D 81/022 |
| | | | | | 206/523 |
| 2009/0152268 | A1 | * | 6/2009 | Whiteman | D21H 27/10 |
| | | | | | 220/62.13 |
| 2010/0101635 | A1 | * | 4/2010 | Koster | B65D 57/004 |
| | | | | | 136/251 |
| 2011/0139660 | A1 | * | 6/2011 | Cabell | B65D 21/0233 |
| | | | | | 206/459.5 |
| 2014/0274633 | A1 | * | 9/2014 | Tilton | B32B 27/12 |
| | | | | | 493/82 |
| 2016/0288978 | A1 | * | 10/2016 | Bergstrom | B31F 1/0077 |
| 2017/0247157 | A1 | | 8/2017 | Parellada Armela et al. | |
| 2021/0095428 | A1 | * | 4/2021 | Yoo | B65D 81/022 |
| 2021/0292974 | A1 | * | 9/2021 | Pierce | B65D 65/40 |

FOREIGN PATENT DOCUMENTS

| | | | | |
|---|---|---|---|---|
| EP | 4035882 A1 | * | 8/2022 | ........... B31B 50/592 |
| JP | 7-256798 A | | 10/1995 | |
| JP | 7-329219 A | | 12/1995 | |
| JP | 08-011248 A | | 1/1996 | |
| JP | 9-328170 A | | 12/1997 | |
| JP | 10-235757 A | | 9/1998 | |
| JP | 2022007850 A | * | 1/2022 | ............. A47K 10/20 |
| JP | 2022007860 A | * | 1/2022 | ............. A47K 10/20 |
| JP | 2022514993 A | * | 4/2022 | |
| KR | 10-0138708 B1 | | 6/1998 | |
| KR | 20-2009-0005274 A | | 6/2009 | |
| KR | 10-1864993 B1 | | 7/2018 | |
| WO | WO-2021060592 A1 | * | 4/2021 | ........... B31B 50/592 |
| WO | WO-2021084846 A1 | * | 5/2021 | ............. A47K 10/20 |

OTHER PUBLICATIONS

Machine Translation of JPH 10-235757 A. (Year: 1998).*
Machine Translation of JPH 09-328170 A. (Year: 1997).*
Machine Translation of JPH 07-329219 A. (Year: 1995).*
Communication dated Nov. 21, 2019, from the Korean Intellectual Property Office, in Application No. 10-2019-0119398.

* cited by examiner

METHOD FOR MANUFACTURING PAPER BUFFER TRAY FOR PACKAGING AND BUFFER TRAY MANUFACTURED THEREBY

TECHNICAL FIELD

The present invention relates to a method for manufacturing a paper buffer tray for packaging and a buffer tray manufactured thereby, and more particularly, a method for manufacturing a paper buffer tray for packaging and a buffer tray manufactured thereby, wherein a paper processed so as to prevent bursting and tearing phenomenon in a process of performing molding corresponding to a shape of a bottle to be packaged with a paper is appropriately cut and used, and a press molding is sequentially performed on several parts in time series.

BACKGROUND ART

In general, in many cases, liquid products such as cosmetics are filled in a glass bottle or a plastic bottle, packaged in a box, and distributed for convenience of distribution or for aesthetic and advertising purposes. However, in the case of the bottle filled with such products, particularly the glass bottle, there is a high risk of breakage when the bottle hits during movement. Thus, it is common to perform packaging by adding a buffer tray in a packaging box. In the case of additionally packaging glass bottles using the buffer tray, a spacing space is formed between the glass bottles, thereby preventing the glass bottles from hitting each other. Furthermore, it is possible to simultaneously serve as a buffer to mitigate impact.

Such a buffer tray is commonly manufactured using soft plastics, pulps, Styrofoam, or the like. However, in recent years, as the seriousness of environmental problems has been on the rise, there are many restrictions on the use of such materials in institutional and environmental terms. For example, the law about saving of resources and promotion of recycling regulates the restrictions on the quality or structure of such packaging material. It is expected to continue or tighten such regulations and restrictions.

Therefore, there is an increasing need to develop a buffer tray using an eco-friendly material in response to this trend. Meanwhile, as an alternative material, paper materials are most strongly presented. However, in the case of paper, there are difficulties in handling such as molding to the required shape or manufacturing to have the required strength. There is an increasing need to develop technologies capable of overcoming these problems and mass-producing paper buffer trays.

DESCRIPTION OF EMBODIMENTS

Technical Problem

The present invention has been made in an effort to solve the above problems and provides a method for manufacturing a paper buffer tray for packaging, wherein a raw material laminated by attaching an inner sheet and one or more outer sheets is molded using a mold to manufacture the paper buffer tray.

In addition, the present invention provides a method for manufacturing a buffer tray, wherein an inner sheet is cut in a length direction and an outer sheet is formed with wrinkle, embossing, or E-flute, such that the buffer tray is not torn or destroyed even when a pressure is applied to a mold, thereby capable of molding a raw material in a required shape.

Furthermore, the present invention provides a method for manufacturing a buffer tray, wherein the buffer tray includes a plurality of molds including springs having different elastic forces, such that the buffer tray is press-molded according to a preset order, thereby capable of molding a raw material without being destroyed.

Solution to Problem

In order to achieve the above-described objects of the present invention and achieve the characteristic effects of the present invention described below, the characteristic construction of the present invention is as follows.

In order to solve the above problems, a method for manufacturing a paper buffer tray for packaging, according to the present invention, includes: a raw material preparing step of preparing a raw material for manufacturing a buffer tray in which a plurality of papers are laminated; a molding preparing step of preparing at least one mold corresponding to a shape and size of a product to be packaged; and a molding step of press-molding the raw material by using the at least one mold.

In addition, the raw material is made by attaching and laminating an inner sheet and at least one outer sheet by an adhesive.

Furthermore, the inner sheet is Kraft paper, and the inner sheet is cut in a length direction of the product to be packaged.

In addition, the inner sheet is alternately cut in a zigzag form alternately in both directions along the length direction.

Meanwhile, the outer sheet is paper in which at least one of wrinkle, E-flute, and embossing is formed.

In addition, the adhesive includes starch.

Furthermore, the molding preparing step includes preparing at least two molds, and a spring is mounted to each of the at least two molds.

Moreover, the molding step includes molding the raw material according to time difference by operating a plurality of molds in a preset order.

Meanwhile, a paper buffer tray for packaging, according to the present invention, is manufactured by one of the proposed methods.

Advantageous Effects of Disclosure

In the method for manufacturing the paper buffer tray for packaging and the buffer tray manufactured thereby, since the buffer tray is manufactured by using the paper as the raw material, it is possible to provide a method for manufacturing an eco-friendly buffer tray. The method for manufacturing the buffer tray using the existing paper has difficulty in molding. In order to overcome such disadvantage, a method for manufacturing a raw material by laminating a plurality of papers.

In particular, the laminated paper includes an inner sheet and at least one outer sheet. Since the inner sheet is cut in a length direction. If necessary, the inner sheet is formed with grooves alternately cut in a zigzag form in both sides along the length direction. Therefore, the inner sheet opens to both sides along the grooves while the inner sheet is molded by external force, thereby preventing tearing or bursting.

In addition, since the outer sheet includes wrinkle, embossing, E-flute, etc., elasticity and ductility are imparted.

Therefore, when the raw material is molded by the external force, the paper naturally stretches, thereby preventing tearing or bursting.

That is, the present invention provides a method for manufacturing a buffer tray and a buffer tray manufactured thereby, wherein a process of specially processing paper as described above is added such that the paper can be molded in a required shape without tearing or bursting.

In addition, the present invention provides a method for manufacturing a paper buffer tray for packaging and a buffer tray manufactured thereby, wherein, when a product seating space is formed, a plurality of molds are provided, the molds include springs having different elastic forces, respectively, and compression molding is performed in a preset order, thereby preventing the raw materials from being torn or destroyed during molding.

BEST MODE

In describing the invention, the inventors may select or define appropriate terms or words. In this case, the terms or words as used herein should not be construed as being limited to the commonly used meanings, but should be construed to conform to the technical spirit embodied in the invention in consideration of the intention of the inventors.

Accordingly, the terms or words as used in the specification and the claims are not construed as being limited to the commonly used meanings. The following description is only a preferred embodiment of the present invention and is not intended to represent or limit all of the technical ideas. Therefore, there may exist examples corresponding to elements and equivalents that can be easily replaced by those of ordinary skill in the art.

Hereinafter, a method for manufacturing a paper buffer tray for packaging and a buffer tray manufactured thereby, according to the present invention, will be described with reference to the accompanying drawings on the basis of the above-described principles.

Figure 1:
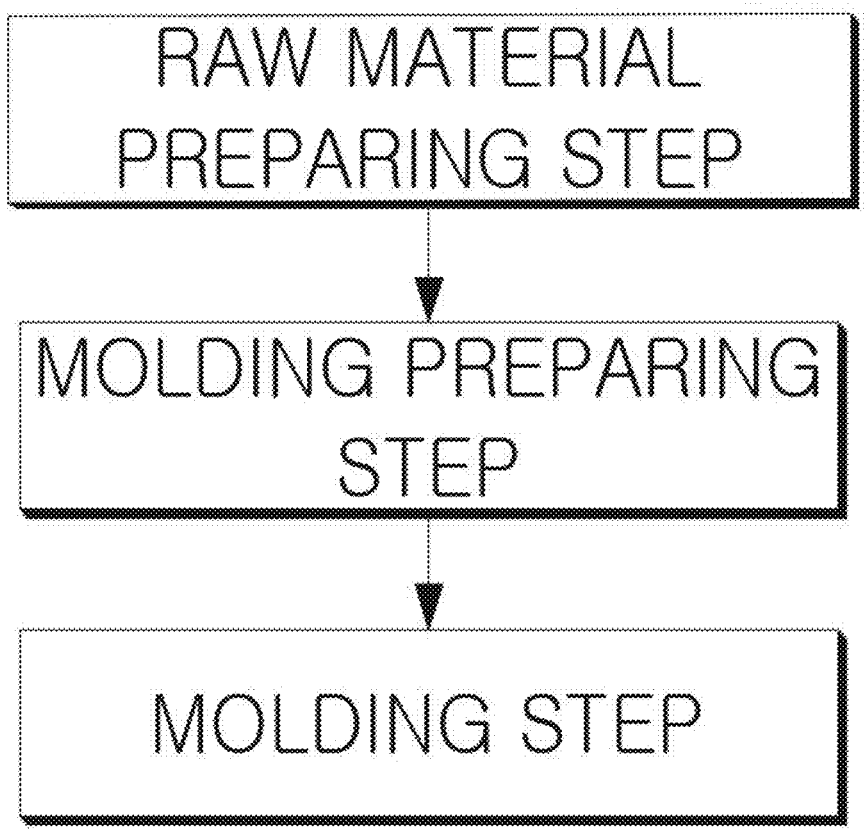
FIG. 1 is a process flowchart schematically showing a method for manufacturing a paper buffer tray for packaging, according to the present invention.

As shown in FIG. 1, a method for manufacturing a paper buffer tray for packaging, according to the present invention, may include a raw material preparing step of preparing a raw material for manufacturing a buffer tray in which a plurality of papers are laminated, a molding preparing step of preparing at least one mold corresponding to the shape and size of a product to be packaged, and a molding step of press-molding the raw material by using the mold.

In practice, the paper is weak to external impact and thus easily torn and at least one part of the paper bursts when pressed for molding. Hence, it is very difficult to produce a specific shape through molding. Therefore, in order to mold a paper into a specific shape using a mold and a press, it is necessary to process the paper into a material that can be molded.

Due to the above necessity, the raw material preparing step according to the present invention is a step of preparing a raw material that can be molded using a mold and a press. The raw material may be made by attaching and laminating an inner sheet and at least one outer sheet by an adhesive. The inner sheet serves to maintain the overall shape of the buffer tray therein when the raw material is molded. The outer sheet set serves to cover the inner sheet from the outside and help to maintain the shape of the outer sheet. When the inner sheet is cut as described below, the outer sheet covers the outer surface of the inner sheet and thus can perform an aesthetic function at the same time.

Preferably, Kraft paper can be used the inner sheet, and the inner sheet is provided with one sheet. However, if necessary, the inner sheet may be provided with two or more sheets. In the preparing step, the outer sheet may be provided by attaching only one sheet or attaching more than one sheet. For example, when only one sheet is attached in the preparation step, it may be possible to additionally attach the outer sheet after the molding step. However, after the molding is performed in a state in which only one sheet is provided by attaching only one sheet, the outer sheet may not be additionally attached. Alternatively, in the preparing step, the outer sheet may be provided by attaching two or more sheets. In this case, the outer sheets are preferably attached to surround the inner sheet on both sides, with the inner sheet being disposed therebetween.

If the outer sheet is made of relatively thin paper, the outer sheet may be provided by laminating a plurality of relatively thin papers. For example, multiple layers of embossed toilet paper may be used, or multiple layers of wrinkled and thin traditional Korean paper may be used.

Even when the inner sheet and the outer sheets are attached by the adhesive as described above, if the inner sheet and the outer sheets are press-molded by external force, most of the inner sheet and the outer sheets may be torn, or part of the inner sheet and the outer sheets may burst. Therefore, additional processing is required such that both the outer sheets and the inner sheet withstand external force.

Figure 3:
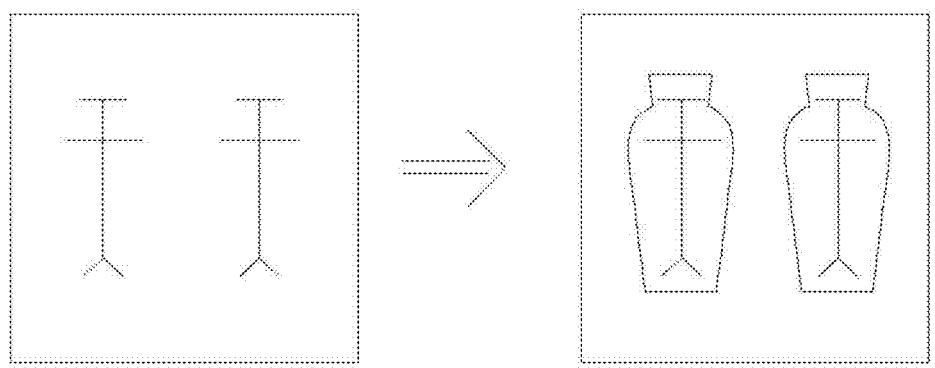
FIG. 3 is a diagram schematically showing a state in which an inner sheet is cut in a straight shape, according to the present invention.

To this end, as shown in FIG. 3, the inner sheet may be cut in the length direction of the product to be packaged. Therefore, when external force is applied through the mold and the press, the cut portion opens to both sides and the force transferred from the outside is concentrated on the cut portion, thereby preventing other portions from being torn or burst. In particular, such a cutting is not only cut in one line shape in the length direction of the product to be packaged, but may thither include at least one line in a direction perpendicular to the length direction. In this case, the tensile fierce can be dispersed not only in the left-and-right direction but also in the up-and-down direction, thereby preventing the tearing or bursting as a whole.

Figure 4:
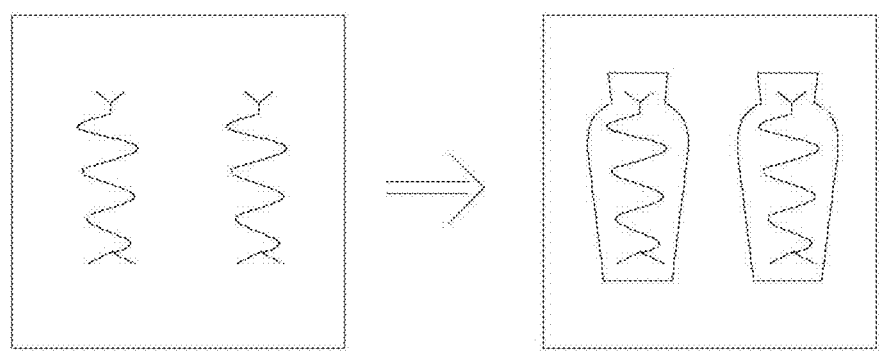
FIG. 4 is a diagram schematically showing a state in which an inner sheet is alternately cut in both directions, according to the present invention.

According to one preferred embodiment, as shown in FIG. 4. The inner sheet may be alternately cut in a zigzag form in both directions along the length direction. In this case, when external force is applied, the force is distributed at each cut surface in various directions based on the cut surface, thereby more stably preventing the bursting or tearing by external force. In this case, the cutting may be a zigzag form having a wave shape alternately curved as shown in FIG. 4, but is not limited thereto. The inner sheet may be cut in a simple zigzag form alternately in a straight line. However, even in this case, as shown in FIG. 4, at least one cut surface having a line segment shape may be further included on both sides in the length direction.

In addition, if there are other reasons, for example, if the size of the product to be packaged is large, at least two or more inner sheets may be overlapped and used. At this time, each of the inner sheets may be cut. When each of the inner sheets is alternately cut in both directions as described above, each of the inner sheets may be laminated such that the alternating cut surfaces overlap each other in opposite directions. That is, the valleys and the peaks of each cut shape intersect with each other, thereby preventing the paper from bursting due to external force.

Figure 5:
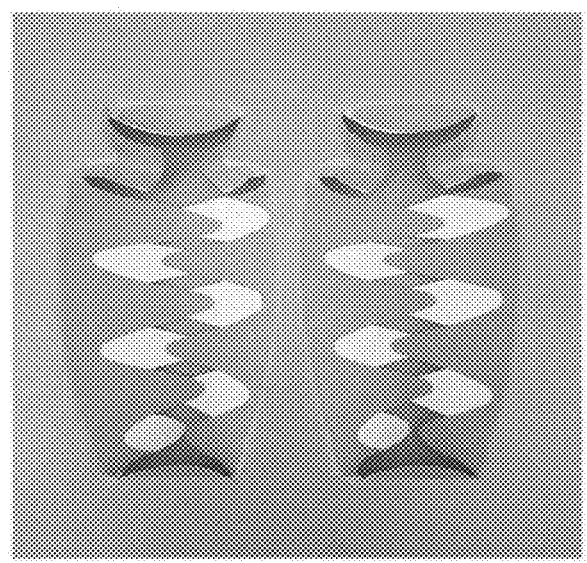
FIG. 5 is a photograph showing a state in which an inner sheet alternately cut in both directions is press-molded, according to the present invention.

FIG. 5 is a photograph showing a schematic shape of the buffer tray molded by using the inner sheet alternately cut in the wave shape in both directions as described above.

Figure 7:
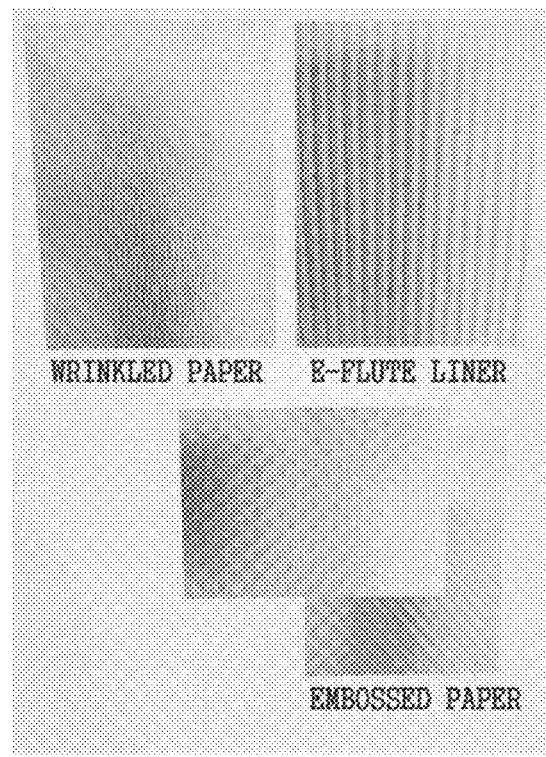
FIG. 7 is a diagram showing a wrinkled paper, an E-flute liner, and an embossed paper, which are used as an outer sheet constituting a raw material, according to the present invention.

Meanwhile, at least one of wrinkle, E-flute, embossing may be formed on the outer sheet. That is, in order to prevent other portions from being torn or burst by being stretched by tensile force caused by external force, the outer sheet may be at least one of a wrinkled paper, an E-flute liner, and an embossed paper as shown in FIG. 7. Therefore, in the case of the wrinkled paper, when external force is applied, the wrinkles are first unfolded before being destroyed, and thus the deformation caused by the external force can be buffered. Similarly, in the case of the E-flute liner, the deformation caused by the external force is buffered while the E-flute is first tensioned. The embossed paper can also be buffered by embossing.

Figure 6:
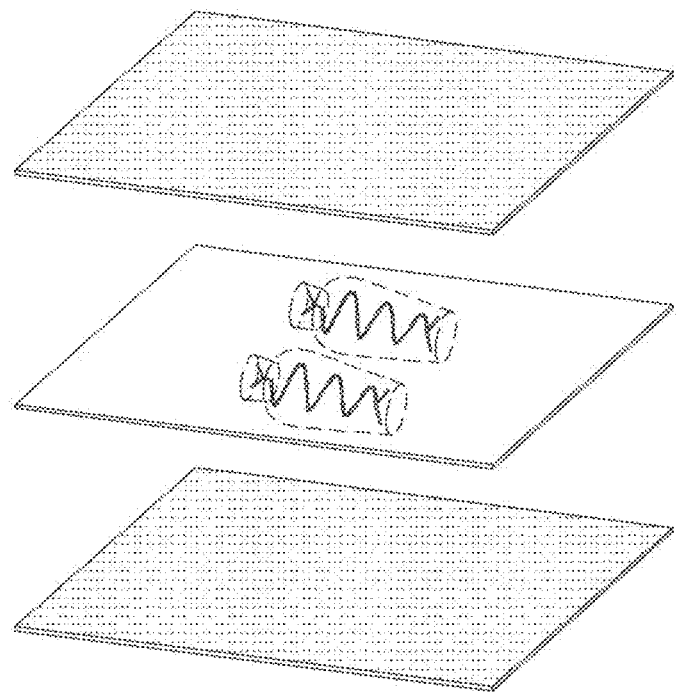
FIG. 6 is a diagram showing an inner sheet and outer sheets constituting a raw material, according to the present invention.

FIG. 6 schematically shows the configuration of the raw material having the cut inner sheet and the embossed paper as the outer sheet. However, the raw material having such a configuration requires an adhesive because the inner sheet and the outer sheet have be bonded to each other.

Any adhesive may be used without limitation as long as the adhesive can attach the contact surfaces of the respective papers to each ether. In some cases, however, when the adhesive is used, the raw material may stick to the mold in the molding process and the shape may not be maintained. Therefore, in order to prevent the above problem, the adhesive may be an adhesive including starch. When the starch is included in the adhesive, it is easy to maintain the shape of the raw material, and the phenomenon of sticking to the mold can be prevented, thereby providing a functional and eco-friendly effect.

In the case of actually molding the buffer tray using paper, the weak strength of the paper itself often causes tearing or bursting. In particular, in the case of a buffer tray for packaging a plurality of products, a plurality of seating spaces have to be formed. When the plurality of seating spaces are formed at the same time, the bursting phenomenon occurs more frequently. In other words, the portion between two seating spaces easily bursts because the portion receives tensile force from both sides at the same time. In order to prevent this problem, each seating space is preferably molded in order.

Therefore, in order to prevent the above problem, the method for manufacturing the paper buffer tray for packaging, according to the present invention, may includes the molding preparing step and the molding step. The molding preparing step is a step of preparing for molding the raw material. At least two molds are prepared for molding, and a spring may be mounted to each mold. In addition, the molding step may be a step of molding the raw material according to time difference by operating the plurality of molds in a preset order.

In this manner, each seating space may be molded in time series to correspond to the mold operated in the preset order. In particular, since the spring is provided, the time when the mold contacts the raw material can be controlled, thereby achieving stable molding.

The spring may be mounted to only one mold and may not be mounted to the other molds. If necessary, the springs may be installed in all the plurality of molds. The spring is installed for the purpose of controlling the time when the plurality of molds contact the raw material. Therefore, when the plurality of molds are all provided with the springs, the springs may be spring having different elastic forces for each mold.

In addition, when the seating spaces are molded by the time difference, a next mold has to perform molding after the mold that performs molding in advance sufficiently drags paper. For this purpose, a spring having sufficient strength is required.

After the molding step is finished, the appearance of the buffer tray may not be neatly finished. Therefore, if necessary, a step of finishing the buffer tray may be performed. For example, a step of attaching a separate printed sticker to the surface of the buffer tray so as to increase aesthetics, removing a protruding portion, or the like may be additionally performed.

Figure 2:
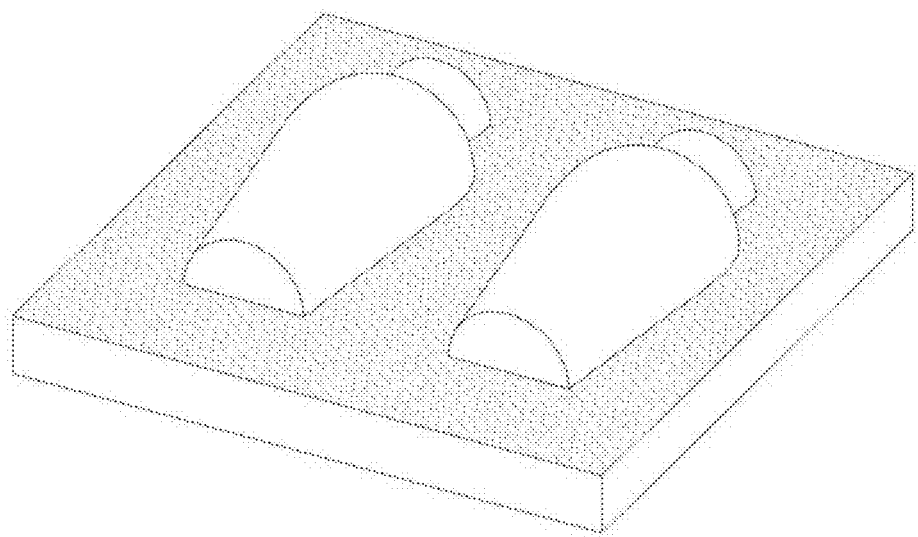
FIG. 2 is a diagram schematically showing a state in which a product is placed on the paper buffer tray for packaging, according to the present invention.

Meanwhile, the paper buffer tray for packaging, according to the invention, is manufactured by the above-described manufacturing method. FIG. 2 is a diagram schematically showing a state in which a product is placed on the paper buffer tray for packaging manufactured according to the present invention. Therefore, the configuration of the buffer tray, which can be obviously derived from the time-series configuration disclosed in the above-described manufacturing method, falls within the scope of the paper buffer tray for packaging according to the present invention.

While the present invention has been particularly shown and described with reference to exemplary embodiments thereof, the present invention is not limited to the specific exemplary embodiments. It will be understood by those of ordinary skill in the art that various modifications may be made thereto without departing from the spirit and scope of the present invention as defined by the appended claims, and such modifications fall within the scope of the claims.

The invention claimed is:

1. A method for manufacturing a paper buffer tray for packaging, comprising:

a raw material preparing step of preparing a raw material by laminating a plurality of sheets of papers;

a molding preparing step of preparing at least one mold corresponding to a shape and size of a product to be packaged; and a molding step of press-molding the raw material by using the at least one mold, wherein the raw material is prepared by attaching and laminating two or more inner sheets of paper and at least one outer sheet of paper by an adhesive, wherein the two or more inner sheets of paper are cut in a length direction around a center portion of the shape of the product to be packaged, wherein the molding preparing step comprises preparing at least two separate molds to apply to different parts of the raw material, and a spring is mounted to one mold of the at least two separate molds to control a timing when the one mold contacts the raw material, the spring being not mounted to other molds of the at least two separate molds, wherein the two or more inner sheets of paper are alternately cut in a zigzag form alternately in both sides along the length direction, and alternating cut surfaces of the two or more inner sheets of paper overlap each other in opposite directions such that valleys and peaks of each cut shape intersect with each other, and wherein the adhesive includes starch.

2. The method of claim 1, wherein the two or more inner sheets of paper are Kraft paper.

3. The method of claim 1, wherein the at least one outer sheet of paper is paper in which at least one of wrinkle, E-flute, and embossing is formed.

4. The method of claim 1, wherein the molding step comprises molding the raw material according to time difference by operating the at least two separate molds in a preset order.

5. A paper buffer tray for packaging, which is manufactured by the method of claim 1.

\* \* \* \* \*